United States Patent Office 2,766,264
Patented Oct. 9, 1956

2,766,264

11β-HYDROXY TESTOSTERONE ACETATE AND PROCESS

Seymour Bernstein, Pearl River, N. Y., and Robert H. Lenhard, Ridgefield Park, N. J., assignors to American Cyanamid Company, New York, N. Y., a corporation of Maine No Drawing. Application October 8, 1952,
Serial No. 313,782

3 Claims. (Cl. 260—397.45)

This invention relates to 11-hydroxy compounds of the androstene series and particularly 11-hydroxy testosterone and esters thereof.

Testosterone and various derivatives of testosterone have been used for their testiculoid activity. Among the common derivatives used, for example, are testosterone propionate and 17-methyl testosterone. In addition to the testiculoid activity, this androgenic material also frequently has other effects which may not be desirable. Thus 17-methyl testosterone has the effect of causing undesirable enlargement of the prostate. An androgenic material which would possess these undesirable properties to a lesser degree would be highly useful.

It is therefore an object of the present invention to provide new compounds of the androstene series. It is a further object of the present invention to provide new derivatives of testosterone. An additional object is to provide a process for preparing the new compounds of the present invention.

The compounds of the present invention may be illustrated by the following structural formula:

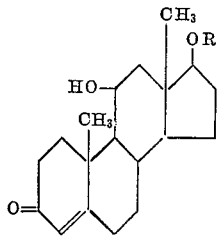

in which R is a member of the group consisting of hydrogen and the residue of lower fatty acids and benzoic acid.

The compounds of the present invention are white crystalline solids, somewhat soluble in the usual organic solvents and relatively insoluble in water.

The compounds are prepared by hydrolyzing a $\Delta^{3,5}$-androstadiene-11β,17β-diol ether in an aqueous acid solution.

In preparing the compounds of the present invention one may start with $\Delta^4$-androstene-3,11,17-trione. The keto group in the 3-position is protected through the formation of an ether radical. This may be accomplished, for example, by treating the $\Delta^4$-androstene with benzyl alcohol, ethyl alcohol and the like. Following protection of the keto group in the 3-position, the ether formed may then be treated with lithium aluminum hydride to convert the keto groups in the 11- and 17-positions to hydroxyl radicals. The protective group in the 3-position is then removed, producing 11β-hydroxy testosterone. If desired, the hydroxyl group in the 17-position may be selectively esterified to produce 11β-hydroxy testosterone esters such as 11β-hydroxy testosterone acetate; 11β-hydroxy testosterone propionate; 11β-hydroxy testosterone butyrate; 11β-hydroxy testosterone benzoate, and the like.

The process of the present invention wherein the $\Delta^{3,5}$-androstadiene-11β,17β-diol ether is hydrolyzed under acid conditions is preferably carried out at a temperature within the range of about 60° to 120° C. While aqueous acetic acid is preferred, other dilute acids can be used such as dilute hydrochloric acid or dilute sulfuric acid. The reaction is usually complete at the above temperatures within a matter of a few minutes up to one or two hours. Following completion of the reaction, the mixture is poured into an aqueous alkaline solution to neutralize the acid and extracted with an organic solvent. The product is then purified by recrystallization from an organic solvent or mixture of organic solvents.

The compounds of the present invention have androgenic properties and are useful in sustaining testiculoid activity.

The following examples illustrate methods of preparing the compounds of the present invention and are intended merely to be illustrative and various modifications may be made therein without departing from the invention.

EXAMPLE 1

*11β-hydroxy testosterone*

A mixture of 200 mg. of $\Delta^4$-androstene-3,11,17-trione, 10 ml. of benzene, 0.1 ml. of benzyl alcohol and 5 mg. of p-toluene-sulfonic acid monohydrate was refluxed with constant water removal for 5 hours. The white crystalline solid obtained by evaporating to dryness under reduced pressure was triturated with cold ethanol containing a trace of pyridine and collected. Four recrystallizations from ethanol containing a trace of pyridine gave 55 mg. of 3-benzyloxy-$\Delta^{3,5}$-androstadiene-11,17-dione, melting point 170°–174° C.

A solution of 135 mg. of 3-benzyloxy-$\Delta^{3,5}$-androstadiene-11,17-dione in 30 ml. of ether and 4 ml. of a saturated solution of lithium aluminum hydride in ether was refluxed for one and one-half hours. The solution was cooled, the excess lithium aluminum hydride decomposed cautiously with water and the inorganic residue filtered off. The inorganic residue was triturated a few times with ether and the combined ether extracts washed with saturated salt solution and with water, dried over magnesium sulfate and filtered through diatomaceous earth. Concentration of the ether solution with the addition of petroleum ether (66°–68° C.) gave 70 mg. of 3-benzyloxy-$\Delta^{3,5}$-androstadiene-11β,17β - diol. Recrystallization from ether-petroleum ether gave 0.070 g., melting point 150°–153°, 156° C., clear. One additional recrystallization from ether gave 57 mg., melting point 150.5°–153°, 156° C., clear, $\epsilon_{240-241.5}$=20,500 (absolute alcohol).

A solution of 156 mg. of 3-benzyloxy-$\Delta^{3,5}$-androstadiene-11β,17β-diol in 8 ml. of 50% aqueous acetic acid was heated on the steam bath for 20 minutes, cooled, poured into saturated sodium bicarbonate solution, salted out and extracted with ethyl acetate. The extract was washed with saturated salt solution and with water, dried over magnesium sulfate, filtered through diatomaceous earth and evaporated under reduced pressure to a white crystalline solid. Recrystallization from acetone-petroleum ether (64°–66° C.) gave 82 mg. of $\Delta^4$-androstene-11β,17-β-diol-3-one (11β-hydroxy testosterone), melting point 235°–236.5° C., $\epsilon_{242}$=14,900 (absolute alcohol), $[\alpha]_D^{30}$=+136° (chloroform).

EXAMPLE 2

*11β-hydroxy testosterone acetate*

A solution of 50 mg. of $\Delta^4$-androstene-11β,17β-diol-3-one in 2 ml. of pyridine was treated in the cold with 1 ml. of acetic anhydride and allowed to stand at room temperature for 15 hours. The solution was partially evaporated under reduced pressure and water and ice was added to give a semi-solid oil. The solution was extracted with ethyl acetate, washed with saturated sodium bicarbonate and with water, dried over magnesium sulfate, filtered through diatomaceous earth and evaporated under reduced pressure to an oil. The oil was dissolved in acetone, treated with activated charcoal, filtered through diatomaceous earth and crystallized by the addition of water to give 26 mg., melting point 143°–146° C. Recrystallization from dilute acetone gave 13 mg. of $\Delta^4$-androstene-11$\beta$,17$\beta$-diol-3-one-17-acetate, melting point 147°–149° C. One additional recrystallization from ether-petroleum ether (64°–66° C.) gave 9 mg., melting point 147.5°–149° C., $\epsilon_{241}$=16,100 (absolute alcohol).

We claim:
1. 11$\beta$-hydroxy testosterone acetate.
2. A method of preparing 11$\beta$-hydroxy testosterone which comprises heating a $\Delta^{3,5}$-androstadiene-11$\beta$,17$\beta$-diol ether in aqueous acid solution and recovering said product therefrom.
3. A method of preparing 11$\beta$-hydroxy testosterone which comprises heating 3-benzyloxy-$\Delta^{3,5}$-androstadiene-11$\beta$,17$\beta$-diol in aqueous acetic acid solution and recovering said compound therefrom.

No references cited.